H. Seger
Tailoring
Nº 2590.   Patented Apr. 29. 1842.
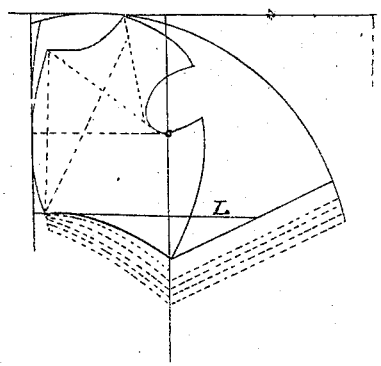
Fig: 5.
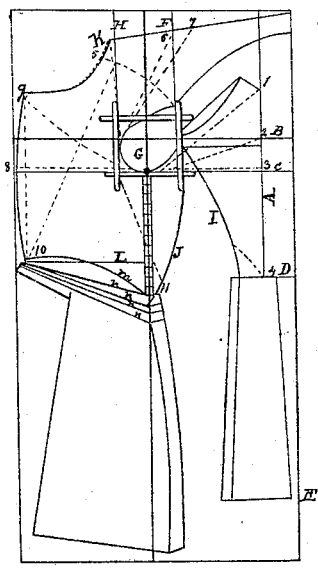
Fig: 2.
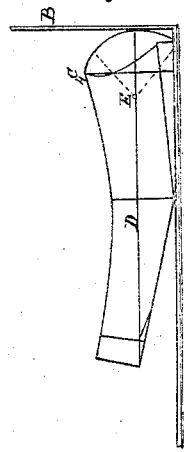
Fig: 3.
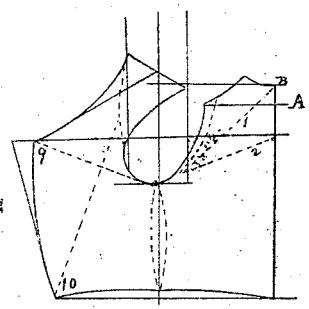
Fig: 4.
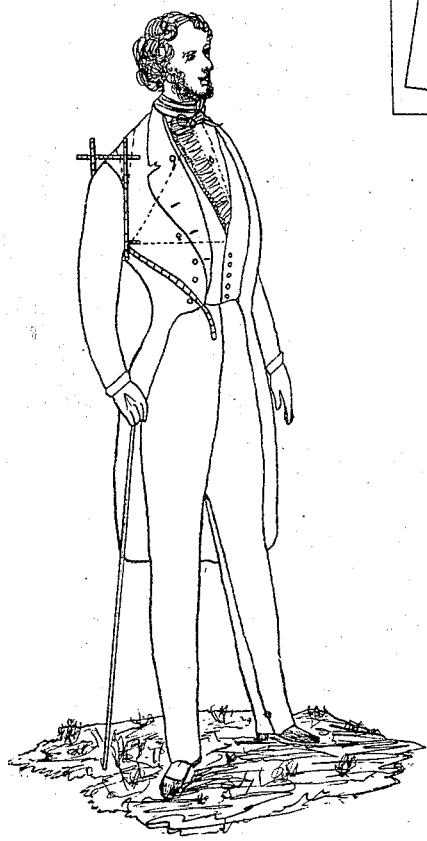
Fig: 6.
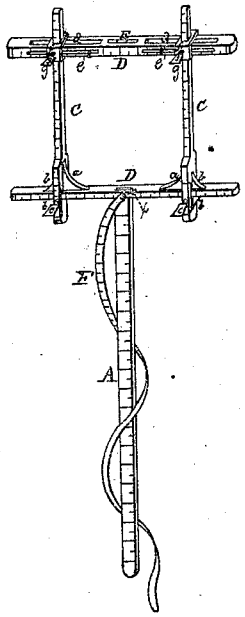
Fig: 1.
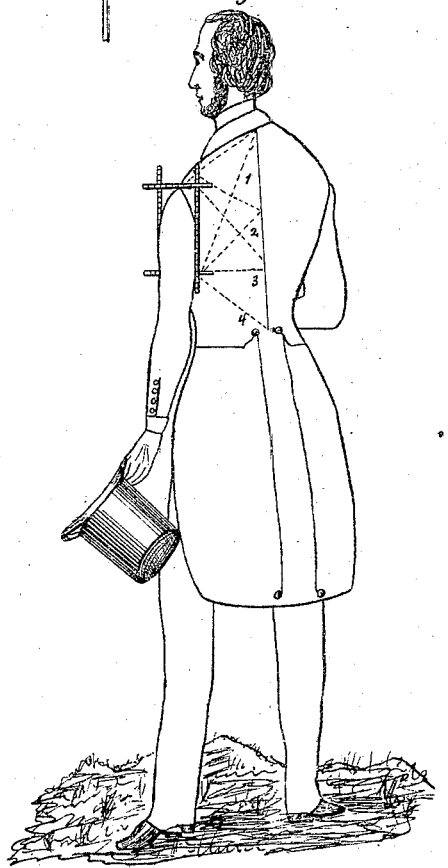
Fig: 7.

UNITED STATES PATENT OFFICE.

HIRAM SEGER, OF MACON, GEORGIA.

MEASURING AND CUTTING GARMENTS.

Specification of Letters Patent No. 2,590, dated April 29, 1842.

*To all whom it may concern:*

Be it known that I, HIRAM SEGER, of Macon, in the county of Bibb and State of Georgia, have invented a new and useful Apparatus for Measuring and Cutting Garments, which I call "Seger's Axilla or Arm-pit Measure"; and I do hereby declare that the following is a full, clear, and exact description of the construction and operation of the same, reference being had to the annexed drawings, making a part of this specification.

The apparatus, of which Figure 1 is a perspective representation, consists of a combination of scales, viz: the vertical stationary scale, A; the horizontal stationary scale, B; the two vertical sliding-scales, C, C; the horizontal sliding-scale, D, with the spirit-level, E; and the flexible scale or tape-measure, F.

The vertical stationary scale (A) is about 18 inches long, and has on its face a division into inches and parts of inches; to the upper end of it, and at right angles with it, is framed or permanently fastened the horizontal stationary scale (B), which is 10 inches or more long, and similarly divided as A. These divisions commence at the common center ($x$) of the aforenamed scales, and run off to the right and left on scale B, and downward on scale A. The two vertical sliding-scales (C, C) are about 10 inches in length each, and their lower extremities are somewhat larger than the remainder, so as to admit of mortises, through which the scale B passes, on which scale (B) they (C, C) are made to slide. They are provided with one larger ($a$) and two smaller triangular braces ($b$, $b$), which assist them to slide more steadily, and to keep them in a right-angular position with scale B; these scales (C, C) are also marked with divisions as the others, commencing at center of the scale B, and running upward to the number of 6 inches or more. After they have been adjusted in their proper position, they are secured and held fast by two thumb-screws ($c$, $c$,), which pass through their enlarged lower ends, and which bear against the scale B. The horizontal sliding-scale D, is of the same length as scale B, divided in the same manner, and parallel with it. It is pierced longitudinally by two vertical mortises or slits ($d$, $d$) of about 4 to 5 inches in length. These mortises allow the scale D to slide up and down on the scales C, C, and also the scales C, C, to and from the center of the scale D, and in its mortises ($d$, $d$). This scale has another horizontal mortise ($e$, $e$) at each end, of the same length as $d$, $d$, in order to make room for the two thumb-screws $g$, $g$, which fasten the scales C, C and D in its proper position, after passing the two boxes $f$, $f$, and then pressing against the scales C, C. These last-mentioned boxes ($g$, $g$) embrace the scales C, C and the respective ends of the scale D, at their intersection. In the center and at the upper surface of the scale D, sunk in so as to be even with it, is placed a spirit-level E, by which the apparatus is adjusted in its proper position. At the common center ($x$) of the scales A and B is fastened the flexible scale F, by which the different measures are to be taken, after the rest of the apparatus has been properly adjusted. The division on its face commences at the said common center ($x$), and proceeds to its end. This scale is from 18 to 24 inches long.

The above-described apparatus may be made of wood, ivory, ebony, metal, or any other suitable material, excepting the flexible scale, which is to be made of leather, tape, or any other suitable texture. The spirit-level is to be made in the usual manner.

*Operation of the apparatus.*—Apply the apparatus around or near the upper joint of the arm, in such a manner as that the center $x$, precisely corresponds with the center of the armpit; then move the scales C, C toward the center until they gently touch the arm in front and back, when they are to be fastened by means of the thumb-screws $c$, $c$. The scale D, resting on the shoulder of the man, has then to be moved horizontally in such manner, as to make the center of the said scale to coincide with the center of the shoulder point, the arm hanging in an easy and natural position. The apparatus having now been closely fitted to the arm, the spirit-level governs the upright position of the person to be measured, while the apparatus itself gives the height and breadth of the scye, as shown in Figs. 6 and 7. The scale A and the tape-measure F, starting from the arm pit, give the width of breast and back, the height of collar-bone and neck, and the length of body, back and skirt, as follows: Commencing with the back (see Fig. 7), extend the tape-measure from the armpit to the socket-bone (1,) and so on to the different points 2, 3, and 4. Then take the measures in front to the points 9 and 8 (see Fig. 6), and then pass the tape from the armpit, up in front and over the shoulder to the points 1, 2 and 3. See before each measure, that the spirit-level be correct; and put down the measures, in inches and part of inches, on a table prepared for the purpose.

*Rules for cutting a dress-coat*, (Fig. 2).— 1st. The line A is placed from the edge of the cloth sufficient for the, 2d., drop 3 inches from top for the back. 3d. Measure the length from the center-measure 8 and 3 to the socket bone, and draw the right-angle line B, which forms the center of the scye. 4th. Draw line C for bottom of scye. 5th. Length of waist. 6th. Length of skirt. 7th. Width of back. Draw scye back line F from C, parallel with line A. 8th. Center of scye line G; draw line length of coat. 9th. Front scye-line H parallel with F and G. 10th. The upper scye is marked parallel with line B. 11th. Form the scye as in diagram. 12th. Sweep the side-seam by the length of waist. 13th. Line J side-seam by the same sweep. 14th. From top of back, as in diagram. 15th. Cut the back out; line B on line F; apply the front measure of the socket bone to the point K, which gives the shoulder point—a desideratum long sought by all of the profession. The point K to remain stationary at the shoulder-point the back moved either out or in to meet the two front armpit-measure 6 and 7. Then form the shoulder-seam by the back. 16th. Bring line I to line J, apply a balance-measure from socket-bone to 4, and move in or out according to the balance-measure. 17th. Apply the waist-measure to get the size of waist; then apply the measure from socket bone down in front to obtain the length of breast; then mark and draw the line L at right angles from line G, and form the curve m, as represented in diagram. 18th. Then measure the front and gorge by the armpit-measure 8 and 9, as represented in Fig. 2. These lines are to be governed by taste and fashion. 19th. The spring of the skirt is obtained, as represented in Fig. 2, on line G; the spring obtained by dropping or raising the skirt on the lines n, n, n. The spring for a man of good proportions is obtained from the top-line n. The spring for a sway-back or hollow is obtained by dropping the hind-part, as represented in diagram. 20th. The skirt will be governed by taste and fashion.

*Rules for cutting the sleeves*, (Fig. 3).— Draw a base-line A on the edge of the cloth, raise a line B at right angles two-thirds of depth of scye down base-line A, draw a perpendicular line C, parallel with B; then mark ¾ of an inch down A from line B; then draw a line D two-thirds of depth of scye, parallel with base-line A; then measure down thirds from B to E the depth of scye; then sweep from 1 to 4, which forms the sleeve-head. Obtain the under sleeve as by diagram.

*Rules for cutting frock-coat skirts*, (Fig. 5).—First obtain the length of skirt; draw the line L across the cloth; then place the fore-part as represented in diagram. You will then form the curve of waist by the curve of fore-part. For spring you will raise or drop the skirt as represented on lines m, n, n in diagram for dress-coat. Cut the coat full or narrow, according to the fashion of the day.

*Rules for cutting a vest*, (Fig. 4).—The front of vest is obtained from the coat-measure, for the back drop down half of the width of scye from B to A, as represented in diagram, which gives the back-shoulder-point.

What I claim as my invention, and desire to secure by Letters Patent, is—

The making and using of an "apparatus (consisting of a combination of scales, and the spirit-level), for measuring and cutting garments," as herein described.

HIRAM SEGER.

Witnesses:
 W. THOMPSON,
 FRANCIS BENNE.